3,385,835
CURABLE MIXTURES COMPRISING CYCLOALI-
PHATIC POLYEPOXY COMPOUNDS, CURING
AGENTS, AND METAL ACCELERATORS
Fritz Kugler, Muttenz, Otto Ernst, Pfeffingen, Basel-Land,
Wolfgang Seiz, Basel, and Peter Ruf, Binningen, Switzerland, assignors to Ciba Limited, Basel, Switzerland,
a Swiss company
No Drawing. Filed Oct. 12, 1964, Ser. No. 403,371
Claims priority, application Switzerland, Oct. 18, 1963,
12,792/63
6 Claims. (Cl. 260—78.4)

ABSTRACT OF THE DISCLOSURE

Curable compositions for coatings, castings, moldings or adhesives and the like are provided by the combination of (a) A cycloaliphatic polyepoxy compound containing at least one 1,2-epoxide group in a five-membered ring,
(b) A curing agent for epoxy resins, especially a polycarboxylic acid anhydride, and
(c) As accelerator, a titanic acid ester or polymeric titanic acid ester, e.g. of the formula

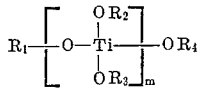

where $R_1$ to $R_4$ each represents an identical or different organic radical, for example an aliphatic, cycloaliphatic, araliphatic, arimatic or heterocyclic radical, and $m$ is an integer. One or several of the radicals $R_1$ to $R_4$ may be an organometal radical or an organic radical containing titanium metal.

The titanic acid ester accelerates the curing of the epoxy resin by polycarboxylic acid anhydrides.

---

It is known that when cycloaliphatic polyepoxides that contain an epoxide group in a five-membered or six-membered ring are hot-cured with a polycarboxylic acid or an anhydride thereof, there are obtained cured, insoluble and infusible products which, compared with similar products obtained by curing conventional epoxy resins, more especially polyglycidyl ether of polyphenols, displays a better heat distortion behaviour. On the other hand the curing reaction takes an unacceptably long time. Accordingly, it has already been proposed in French Patent 1,282,227, granted to Union Carbide Corporation on Dec. 11, 1961, to accelerate the curing of certain cycloaliphatic polyepoxides, for example 6-methyl-3,4-epoxy-cyclohexylcarboxylic acid-(6-methyl-3, 4-epoxy-cyclohexyl)methyl ester, with curing agents such as polycarboxylic acid anhydrides, by adding tin (II) salts of carboxylic acid or tin (II) alcoholates.

Furthermore, French Patent No. 1,270,902, granted July 24, 1961, to Ciba Societe Anonyme, Basel, proposes to use tertiary amines or alkali metal alcoholates as accelerators for curing certain cycloaliphatic polyepoxy acetals, for example 3-(3',4'-epoxycyclohexyl-9, 10-epoxy-2, 4-dioxaspiro (5.5) undecane, with polycarboxylic acid anhydrides.

These known accelerators, however, produce good results only in curing cycloaliphatic polyepoxides whose cycloaliphatic epoxide group is contained in a six-membered ring. When, on the other hand, it is attempted to hot-cure cycloaliphatic polyepoxides that contain a cycloaliphatic epoxide group in a five-membererd ring—for example (4-oxatetracyclo(6.2.1.0$^{2,7}$0$^{3,5}$)hendec-9-yl) glycidyl ether—with polycarboxylic acid anhydrides and to accelerate the curing reaction by adding, for example, a tin (II) carboxylate or a sodium alcoholate, the resulting products have mechanical properties so bad that they are unsuitable for use in industry.

Surprisingly, it has now been found that it is possible to usefully accelerate the curing of cycloaliphatic polyepoxides, in which at least one epoxide group is located in a five-membered ring, with the aid of polycarboxylic acid anhydrides by adding a titanic acid ester; the cured products thus obtained have excellent mechanical properties.

Accordingly, the present invention provides curable mixtures for the production of coatings, castings, mouldings or adhesives, which mixtures are also suitable for use as interlayer materials in laminates, containing (a) A cycloaliphatic polyepoxy compound containing at least one 1,2-epoxide group in a five-membered ring,
(b) A curing agent for epoxy resins, especially a poly carboxylic acid anhydride, and
(c) As accelerator, a titanic acid ester or polymeric titanic acid ester, e.g. of the formula

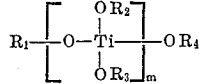

where $R_1$ to $R_4$ each represents an identical or different organic radical, for example an aliphatic, cycloaliphatic, araliphatic, aromatic or heterocyclic radical, and $m$ is an integer. One or several of the radicals $R_1$ to $R_4$ may be an organometal radical or an organic radical containing titanium metal.

Suitable cycloaliphatic polyepoxy compounds containing at least one five-membered ring to which 1,2 epoxide group is attached are:

dicyclopentadienediepoxide, glycidyl-,2,3-epoxy-cyclopentylether, bis(cyclopentenyl)ether-diepoxide, 2,3-epoxybutyl-2,3-epoxycyclopentylether, epoxypentyl-2,3-epoxycyclopentylether, 9,10-epoxystearyl-2,3-cyclopentylether, 3,4-epoxycyclohexylmethyl-2,3-cyclopentylether, 2,2,5,5-tetramethyl-3,4-epoxycyclohexylmethyl-2,3-cyclopentylether, 2,2,5,5,6-pentamethyl-3,4-epoxycyclopentylether;

2,3-epoxycyclopentyl-9,10-epoxystearate, 2,3-epoxycyclopentyl-3,4-epoxycyclohexylcarboxylate, 2,3-epoxycyclopentyl-2,2,5,5-tetramethyl-3,4-epoxycyclohexylcarboxylate;

(3,4-epoxy-2,5-endomethylene-cyclohexylmethyl)-3,4-epoxy-2,5-endomethylene-cyclohexanecarboxylate, bis(3,4-epoxy-2,5-endomethylene-cyclohexylmethyl) succinate;

bis(3,4-epoxy-2,5-endomethylene-cyclohexylmethyl)formal, bis(3,4-epoxy-2,5-endomethylene-hexahydrobenzal)pentaerythritol, 3-(3',4'-epoxy-2',5'-endomethylenecyclohexylmethyl)-9,10-epoxy-2,4-dioxaspiro(5.5) undecane;

bis(3-oxatricyclo(3.2.1.0$^{2,4}$)oct-6-yl)carbonate, bis(3-oxatricyclo(3.2.1.0$^{2,4}$)oct-6-yl)succinate, (3-oxatricyclo(3.2.1.0$^{2,4}$)oct-6-yl)-3,4-epoxy-cyclohexylcarboxylate, (3-oxatricyclo(3.2.1.0$^{2,4}$)oct-6-yl)9,10-epoxy-octadecanoate;

furthermore, especially epoxidized ethers and esters of dihydrodicyclopentadiene-8-ol, such as (4-oxatetracyclo(6.2.1.0.$^{2,7}$0$^{3,5}$)hendec-9-yl)glycidyl-ether, (4-oxatetracyclo(6.2.1.0$^{2,7}$0$^{3,5}$)hendec-9-yl)-2,3-epoxy-butylether, (4-oxatetracyclo(6.2.1.0$^{2,7}$0$^{3,5}$)-hendec-9-yl)-6-methyl-3,4-epoxy-cyclohexylmethyl-ether, (4-oxatetracyclo(6.2.1.0$^{2,7}$0$^{3,5}$)hendec-9-yl)-3,4-epoxycyclohexylether, (4-oxatetracyclo(6.2.1.0$^{2,7}$0$^{3,5}$)hendec-9-yl)-3-oxatricyclo-(3.2.1.0$^{2,4}$)-oct-6-yl-ether, (4-oxatetracyclo(6.2.1.0$^{2,7}$0$^{3,5}$)hendec-9-yl)-3,4-epoxy- 2,5-endomethylene-cyclohexylmethyl)ether;
ethyleneglycol-bis(4-oxatetracyclo(6.2.1.0$^{2,7}$0$^{3,5}$)hendec-9-yl)ether, diethyleneglycol-bis(4-oxatetracyclo (6.2.1.0$^{2,7}$0$^{3,5}$)hendec-9-yl)ether, 1,3-propyleneglycol-bis(3-oxatetracyclo(6.2.1.0$^{2,7}$0$^{3,5}$)-hendec-9-yl)ether, glycerol-bis(4-oxatetracyclo(6.2.1.0$^{2,7}$0$^{3,5}$)hendec-9-yl)ether;
bis(4-oxatetracyclo(6.2.1.0$^{2,7}$0$^{3,5}$)hendec-9-yl)ether;
bis(4-oxatetracyclo(6.2.1.0$^{2,7}$0$^{3,5}$)hendec-9-yl)formal;
bis(4-oxatetracyclo(6.2.1.0$^{2,7}$0$^{3,5}$)hendec-9-yl)succinate;
bis(4-oxatetracyclo(6.2.1.0$^{2,7}$0$^{3,5}$)hendec-9-yl)maleate;
bis(4-oxatetracyclo(6.2.1.0$^{2,7}$0$^{3,5}$)hendec-9-yl)phthalate;
bis(4-oxatetracyclo(6.2.1.0$^{2,7}$0$^{3,5}$)hendec-9-yl)adipate;
bis(4-oxatetracyclo(6.2.1.0$^{2,7}$0$^{3,5}$)hendec-9-yl)sebacate;
tris(4-oxatetracyclo(6.2.1.0$^{2,7}$0$^{3,5}$)hendec-9-yl)tri-mellitate, 9,10-epoxy-octadecanoic acid-[4-oxatetracyclo (6.2.1.0$^{2,7}$0$^{3,5}$)hendec-9-yl]ester and 9,10,12,13-diepoxy-octadecanoic acid(4-oxatetracyclo-[6.2.1.0$^{2,7}$ 0$^{3,5}$]hendec-9-yl)ester.

As suitable curing agents for the cycloaliphatic epoxy compounds there may be mentioned, for example: Polyfunctional amines, that is to say amines containing at least two active hydrogen atoms, polyalcohols, polyphenols, polythiols, polyisocyanates, polyisothiocyanates, polycarboxylic acids and especially polycarboxylic acid anhydrides.

As polyfunctional amines there may be mentioned: Methylamine, propylamine, butylamine, isobutylamine, 2-ethylhexylamine; aniline, ortho-hydroxyaniline, meta-toluidine, 2,3-xylidine, benzylamine, 1-naphthylamine, ortho-, meta- and para-phenylenediamine; para,para'-methylenedianiline, cyclohexylamine, cyclopentylamine, para-methane-1,8-diamine; polyamides of an average molecular weight from 300 to about 10,000, obtained by condensing a diamine such as ethylenediamine, diethylenetriamine, triethylenetetramine or propylenediamine, with a polycarboxylic acid such as malonic, succinic, glutaric, adipic acid or with a dimerized unsaturated fatty acid, such as di-linolenic acid; aliphatic polyamines such as ethylenediamine, propylenediamine, butylenediamine, hexylenediamine, octylenediamine, nonylenediamine, decylenediamine, diethylenetriamine, triethylenetetramine, tetraethylenepentamine, dipropylenetriamine; adducts of 1,2-epoxides such as butadiene dioxide, diglycidyl ether and especially ethylene oxide or propylene oxide with polyalkylenepolyamines or arylenepolyamines such as ethylenediamine, diethylenetriamine, triethylenetetramine, phenylenediamine or methylenedianiline. Aminoalcohols such as 2-aminoethanol, 2-aminopropanol, 1,3-diamino-2-propanol; heterocyclic polyamines such as piperazine, 2,5-dimethylpiperazine, N-(aminoethyl)morpholine, N-(aminopropyl)morpholine, melamine, 2,4-diamino - 6 - (aminoethyl)pyrimidine, dimethylurea, guanidine, para,para'-sulfonyldianiline and 3,9-bis(aminoethyl)spirobi-metadioxane.

As a rule, the polyfunctional amine is used in an amount such that the curable mixture contains for every equivalent of epoxide groups of the cycloaliphatic polyepoxy compound from 0.2 to 5.0, preferably from 0.3 to 3.0, active amine hydrogen atoms.

As polyalcohols and polyphenols there may be mentioned:
Ethyleneglycol, diethyleneglycol, polyethyleneglycols, dipropyleneglycol, polypropyleneglycols, trimetheneglycol butanediols, pentanediols, 12,13-tetracosanediol, glycerol, polyglycerols, pentaerythritol, sorbitol, polyvinyl alcohols, cyclohexanediols, inositol; dihydroxytoluenes, resorcinol, pyrocatechol, bis(4-hydroxyphenyl)dimethylmethane and bis(4-hydroxyphenyl)methane and the adducts of ethylene oxide or propylene oxide with such phenols.

The polyols are in general used in amounts such that the curable mixture contains for every equivalent of epoxide groups of the cycloaliphatic polyepoxy compound from 0.1 to 2.0, preferably from 0.2 to 1.5, hydroxyl groups.

As polycarboxylic acids there may be mentioned: Oxalic, malonic, succinic, glutaric, adipic, pimelic, suberic, azelaic, sebacic acid, alkylsuccinic acids, alkenylsuccinic acids, maleic, fumaric, itaconic, citraconic, mesaconic, ethylidenemalonic, isopropylidenemalonic, allylmalonic, muconic, diglycollic, dithioglycollic, 1,2-cyclohexanedicarboxylic, 1,4-cyclohexanedicarboxylic, phthalic, isophthalic, terephthalic, tetrahydrophthalic, tetrachlorophthalic, 1,8-naphthalenedicarboxylic, 1,2-naphthalenedicarboxylic, 3-carboxycinnamic, 2 - carboxy - 2-methylcyclohexaneacetic, 1,1,5 - pentanetricarboxylic, 1,2,4 - hexanetricarboxylic, 5-octene - 3,3,6-tricarboxylic, 1,2,4-benzenetricarboxylic, 1,3,5 - benzenetricarboxylic, 3-hexene-2,2,3,4-tetracarboxylic, 1,2,3,4 - benzenetetracarboxylic, 1,2,3,5-benzenetetracarboxylic, pyromellitic, benzenepentacarboxylic, mellitic acid; dimerized or polymerized unsaturated fatty acids such as dimerized linseed oil fatty acid, tung oil or soybean fatty acid, having an average molecular weight from 500 to 5000; furthermore the polycarboxypolyesters, containing at least two carboxyl groups per molecule, obtained by condensing polyalcohols, such as ethyleneglycol, diethyleneglycol, propyleneglycol, 1,4-butanediol, 1,6-hexanediol, glycerol, trimethylolpropane or pentaerythritol with an excess of the polycarboxylic acids listed above.

In general, the polycarboxylic acids are used in an amount such that the curable mixture contains for every equivalent of epoxide groups of the cycloaliphatic polyepoxy compound from 0.3 to 1.25, preferably from 0.3 to 1.0, carboxyl groups.

As polycarboxylic acid anhydrides preferably used in the curable mixtures of this invention there may be mentioned the anhydrides of the following acids: Succinic, glutaric, propylsuccinic, methylbutylsuccinic, hexylsuccinic, heptylsuccinic, allylsuccinic, pentenylsuccinic, octenylsuccinic, nonenylsuccinic, α,β-diethylsuccinic, maleic, chloromaleic, dichloromaleic, itaconic, citraconic, hexahydrophthalic, tetrahydrophthalic, methyltetrahydrophthalic, tetrachlorophthalic, hexacloroendomethylene tetrahydrophthalic (chlorendic), tetrabromophthalic, tetraiodophthalic, 4 - nitrophthalic, 1,2 - naphthalenedicarboxylic acid; polymeric polycarboxylic acid anhydrides obtained by autocondensation of dicarboxylic acids, such as adipic, pimelic, sebacic, terephthalic or isophthalic acid.

Furthermore anhydrides of the Diels-Alder adducts of maleic acid with alicyclic compounds containing conjugated double bonds, for example bicyclo(2.2.1)heptene-2,3 - dicarboxylic acid anhydride (nadic anhydride), methyl-bicyclo(2.2.1)heptene - 2,3-dicarboxylic acid anhydride (methylnadic anhydride) and allylbicyclo(2.2.1) heptene-2,3-dicarboxylic acid anhydride.

In general the polycarboxylic acid anhydrides are used as curing agents in an amount such that the curable mixture contains for every equivalent of epoxy groups of the cycloaliphatic polyepoxy compound from 0.1 to 1.5, preferably from 0.2 to 1.0, equivalent of anhydride groups.

The titanic acid esters used as accelerators in this invention are added to the curable mixtures advantageously in an amount from 0.001 to 20% by weight, preferably from 0.1 to 10% by weight, referred to the total weight of the ingredients (a), (b) and (c) of the mixture.

As suitable titanic acid esters and polymeric titanic acid esters respectively there may be mentioned: Tetraphenyltitanate, tetramethyltitanate, tetraethyltitanate, tetraisopropyltitanate, tetra-n-butyltitanate, tetradecyltitanate, ocyleneglycoltitanate, tetradodecyltitanate; polymeric alkyltitanates; tetra(hydroxyethyl)titanate, tetra(hydroxybutyl)titanate, tetra(aminoethyl)titanate and tetra(methylaminobutyl)titanate. Processes for the manufacture of such titanates have been described, for example, in U.S.

Patent No. 2,672,455, granted Mar. 16, 1954, to Dow Corning Corporation, Midland, Mich.

Likewise suitable are mixed titanic acid esters containing two or more titanium atoms per molecule, which are obtained by reacting a tetraalkyltitanate with a polyhydric alcohol, for example the titanic acid ester of the formula $(C_4H_9O)_3Ti-O-C_2H_4-O-Ti(OC_4H_9)_3$ obtained by reacting tetrabutyltitanate with ethyleneglycol.

There are also suitable mixed titanic acid esters, such as are obtained by partial transesterification of alkyltitanates, such as tetra-isopropyltitanate or tetrabutyltitanate, with high aliphatic cycloaliphatic, araliphatic or heterocyclic alcohols, for example polyethyleneglycols, polypropyleneglycols, 4 - oxatetracyclo - $(6.2.1.0^{2,7}0^{3,5})$-hendecan-9-ol or 4-hydroxy-2-sulfolene.

Lower alkyltitanates, such as tetrabutyltitanate, are in general not directly soluble in the cycloaliphatic polyepoxy compound or in the mixture of the polyepoxy compound with the curing agent. However, it has been surprisingly found that homogeneous curable mixtures are obtained when the tetrabutyltitanate is first fused together with a polycarboxylic acid anhydride, and the resulting homogeneous mixture of the curing agent with the accelerator is then mixed with the cycloaliphatic polyepoxide. The titanic acid esters, which are accessible by total or partial transesterification of lower tetraalkyltitanates with higher alcohols, on the other hand, are in general readily compatible with the cycloaliphatic polyepoxide, which enables them to be added directly to the polyepoxide or to the mixture of polyepoxide+curing agent.

The invention further includes a process for curing cycloaliphatic polyepoxy compounds containing at least one 1,2-epoxide group in a five-membered ring, with curing agents, especially with polycarboxylic acid anhydrides, preferably at an elevated temperature, wherein the curing accelerator used is a titanic acid ester or a polymeric titanic acid ester, e.g. of the formula

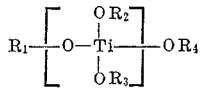

where $R_1$ to $R_4$ each represents an identical or different organic radical, and $m$ is an integer.

The term "curing" as used in this context signifies the cross-linking of the polyepoxy esters with the polyfunctional curing agents to form insoluble and infusible resins having good mechanical properties. In certain cases curing can be achieved by simply mixing the epoxy compound, the curing agent and the accelerator at room temperature or with moderate heating. In general—especially when polycarboxylic acid anhydrides are used as curing agents—curing is performed at an elevated temperature, for example at a temperature ranging from 120° to 160° C.

Furthermore, the curable mixtures of the cycloaliphatic polyepoxy compound, the curing agent and the accelerator may be admixed at any stage prior to the curing reaction with fillers, plasticisers, pigments, dyestuffs, flame-inhibitors or mould lubricants. Suitable extenders and fillers are, for example, rutile, mica, quarth meal, rock meal, alumina trihydrate, calcium carbonate, ground dolomite, gypsum or barium sulfate.

To improve the mechanical properties there may be further added fibers of fabrics of glass, polyesters, nylon, polyacrylonitrile, silk or cotton.

Furthermore, for the manufacture of plastic foams there may be added the usual propellants, for example compounds that give off carbon dioxide or nitrogen under the curing conditions, and/or low-boiling inert organic liquids, such as trichlorofluoromethane.

The curable mixtures of this invention may be used without or with fillers, if desired in the form of solutions or emulsions, as laminating resins, paints, lacquers, dipping resins, casting resins, coating compositions, pore fillers, putties, adhesives, moulding compositions, plastic foams and insulating compounds for the electrical industry, as well as for the manufacture of such products.

Percentages in the following examples are by weight.

Example 1

In experiment A 66.5 g. of hexahydrophthalic anhydride are dissolved at 50° to 60° C. in 100 g. of a diepoxide prepared as described in Example 2 of French Patent No. 1,261,102, granted 4.4.61 to Ciba Societe Anonyme, Basel, corresponding to the formula

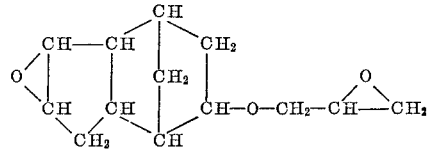

([4 - oxatetracyclo$(6.2.10^{2,7}0^{3,5})$hendec - 9 - yl]glycidyl ether, containing 6.35 epoxide equivalent per kg.) and the mixture is poured into an aluminum mould (12 x 40 x 140 mm.) and cured for 24 hours in a heating cabinet at 120° C.

In experiment B 87 g. of hexahydrophthalic anhydride are fused, then heated to 80° to 90° C. and 5 g. of tetra-n-butyltitanate are vigorously stirred in. 100 g. of the diepoxide used in experiment A are then stirred into the resulting curing agent+accelerator mixture. This procedure is necessary because tetra-n-butyltitanate dissolves directly neither in the diepoxide nor in the mixture of diepoxide+curing agent. The mixture is then poured into an aluminum mould (12 x 40 x 140 mm.) as in experiment A and cured for 24 hours at 120° C.

After having cooled, the resulting castings are cut up into test bars, which reveal the following heat distortion behaviour:

Heat distortion point according to Martens (DIN), ° C.:
  Specimen A _____ 72
  Specimen B _____ 137

Example 2

85 g. of tetrabutyltitanate (0.25 mol) are heated to 50° C. in a 250 ml. three-necked flask with air-leak tube, thermometer and distillation head with 42 g. (0.25 mol) of 4 - oxatetracyclo$(6.2.1.0^{2,7}0^{3,5})$hendecan-9-ol under a vacuum of 12 mm. Hg, while continuously distilling off the n-butanol formed by the transesterification.Towards the end the distillation is continued under a pressure of about 1 mm. Hg until the theoretical amount of n-butanol has been expelled from the reaction mixture. The resulting liquid, mixed titanic acid ester I was used as accelerator in the following manner:

87 g. of hexohydrophthalic anhydride are dissolved at 50° to 60° C. in 100 g. of the diepoxide used in Example 1, and 6.4 g. of the mixed titanic acid ester I are added. The mixture is poured into a mould and then cured as described in Example 1. The heat distortion point according to Martens (DIN) revealed by test specimens made from the resulting casting was 141° C.

Example 3

A mixture of 85 g. (0.25 mol) of tetra-n-butyltitanate and 67 g. (0.5 mol) of 4-hydroxy-2-sulfolene of the formula

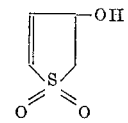

is heated in a three-necked flask equipped with thermometer, air-leak tube and distillation head to 50° C. under a vacuum of 12 mm. Hg, while continuously distilling off the n-butanol formed. When most of the n-butanol has been expelled, the residue is distilled under 1 mm. Hg pressure. The resulting mixed titanic acid ester 2 turns partially crystalline when kept for a prolonged time; it was used as a curing accelerator in the following manner:

87 g. of hexahydrophthalic anhydride are dissolved at 50° to 60° in 100 g. of the diepoxide used in Example 1, and 6.8 g. of the mixed titanic acid ester 2 are then added. The mixture is poured into a mould as described in Example 1 and cured for 24 hours at 120° C. When test specimens were cut from the resulting casting and tested, they revealed a heat distortion point according to Martens (DIN) of 148° C.

Example 4

A mixture of 85 g. (0.25 mol) of tetra-n-butyltitanate and 54 g. of propyleneglycol (average molecular weight about 400) is heated as described in Example 3 to 50° C. under 12 mm. Hg pressure, while distilling off the liberated n-butanol. The resulting mixed titanic acid ester 3 was used as curing accelerator in the following manner:

100 g. of the diepoxide used in Example 1 are mixed at 50° to 60° C. with 87 g. of hexahydrophthalic anhydride, and 6.9 of the mixed titanic acid ester 3 are then added. The mixture is poured into a mould and cured for 24 hours at 120° C. Test specimens made from it reveal a heat distortion point according to Martens (DIN) of 130° C.

Example 5

A mixture of 1 kg. of 4-oxatetracyclo(6.2.1.0$^{2,7}$0$^{3,5}$) hendec-9-yl-tall oil acid ester and 64 g. of the titanic acid ester described in Example 2 and 620 g. of hexahydrophthalic anhydride is heated at about 60° C., until the hexahydrophthalic anhydride has dissolved, then poured into a mould and cured for 24 hours at 120° C. as in Example 1. The resins possess the following properties:

Heat distortion point according to Martens
 (DIN) _____° C__  43
Flexural strength _____kg./mm.$^2$__  8.2
Impact strength _____cm. kg./cm.$^2$__  5.5

A comparable specimen that does not contain the titanic acid ester remained liquid under identical curing conditions.

Example 6

A mixture of 1 kg. of bis(4-oxatetracyclo[6.2.1.0$^{2,7}$0$^{3,5}$] hendec-9-yl)glycerol ether of the formula

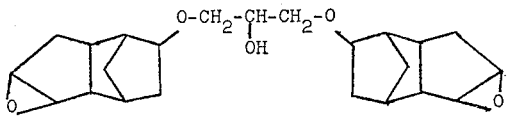

50 g. of titanic acid ester of Example 2 and 580 g. of hexahydrophthalic anhydride is heated to 60° C. and then poured into a mould as described in Example 1. The resin obtained by curing for 24 hours at 120° C. displayed a heat distortion point according to Martens (DIN) of 128° C. A corresponding specimen that did not contain the titanic acid ester had only partially cured through after the same curing time and was so brittle that the specimens could not be prepared for the heat distortion point test.

Example 7

4 specimens of 1 kg. each of the diepoxide used in Example 1 were mixed with hexahydrophthalic anhydride and optionally further substances shown in the following table. In each case the optimum ratio of anhydride to epoxide was selected.

| Specimen (in grams) | A | B | C | D |
|---|---|---|---|---|
| Diepoxide (cf. Example 1) | 1,000 | 1,000 | 1,000 | 1,000 |
| Hexahydrophthalic anhydride | 655 | 865 | 865 | 865 |
| Boron trifluoride-monoethylamine complex | | 5 | 10 | 5 |
| Tetrabutyltitanate | | | | 5 |

To prepare a specimen A the two components were mixed at 50° to 60° C.; specimens B, C and D were obtained by preparing at 100° C. a solution of the catalyst added in the anhydride, cooling the solution of 60° C. and then stirring in the epoxy resin. Part of the finished casting resin mixture was used to determine in a Hoeppler dropping ball viscometer the time required for the viscosity to rise at 120° C. to 1500 centipoises (shelf life at 120° C.). Another part of the mixture was poured into an aluminum mould (12 x 50 x 140 mm.) and cured for 24 hours at 100° C.

The shelf life and the heat distortion points according to Martens were found to be as follows:

| | A | B | C | D |
|---|---|---|---|---|
| Shelf life up to 1,500 centipoises at 120° C | [1] 10 | [1] 5 | [2] 75 | [2] 46 |
| Heat distortion point acedg. to Martens (DIN), ° C | 72 | 55 | 60 | 144 |

[1] Hours.
[2] Minutes.

What is claimed is:

1. A curable composition of matter consisting essentially of
   (a) a cycloaliphatic polyepoxy compound containing at least one 1,2-epoxide group in a five-membered carbocyclic ring,
   (b) a polycarboxylic acid anhydride curing agent for epoxy resins, and
   (c) as curing accelerator a member selected from the group consisting of a titanic acid ester and a polymeric titanic acid ester.

2. A curable composition as claimed in claim 1, containing as accelerator (c) tetra-n-butyltitanate.

3. A curable composition as claimed in claim 1, containing as accelerator (c) a mixed titanic acid ester obtained by partial transesterification of a lower tetraalkyltitanate with a higher alcohol, said ester being soluble in the cycloaliphatic polyepoxy compound.

4. A curable composition as claimed in claim 1, containing the titanic acid ester in an amount from 0.1 to 10% by weight, referred to the total weight of the components (a), (b) and (c) of the mixture.

5. A curable composition as claimed in claim 1, containing the polycarboxylic acid anhydride in an amount such that the mixture contains for every equivalent of epoxide groups of the cycloaliphatic polyepoxy compound (a) from 0.2 to 1.0 equivalent of anhydride groups.

6. A curable composition as claimed in claim 1, containing as polyepoxy compound the (4-oxatetracyclo-[6.2.1.0$^{2,7}$0$^{3,5}$]hendec-9-yl)glycidyl ether.

References Cited

UNITED STATES PATENTS

| 2,946,756 | 7/1960 | Wheelock et al. | 260—2 |
| 3,210,379 | 10/1965 | Porret | 260—78.4 |
| 3,047,515 | 7/1962 | Piirma | 260—2 |

WILLIAM H. SHORT, *Primary Examiner.*

T. PERTILLA, *Assistant Examiner.*